U S009091323B2

United States Patent
Kim

(10) Patent No.: US 9,091,323 B2
(45) Date of Patent: Jul. 28, 2015

(54) ORIFICE PLATE FOR ENGINE MOUNT FILLED WITH MAGNETORHEOLOGICAL FLUID

(75) Inventor: Jang-Ho Kim, Bucheon-shi (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 281 days.

(21) Appl. No.: 13/547,977

(22) Filed: Jul. 12, 2012

(65) Prior Publication Data
US 2013/0032229 A1    Feb. 7, 2013

(30) Foreign Application Priority Data
Aug. 1, 2011    (KR) .................. 10-2011-0076418

(51) Int. Cl.
*F16L 41/00*    (2006.01)
*F16F 13/30*    (2006.01)
*F16F 13/10*    (2006.01)

(52) U.S. Cl.
CPC ............. *F16F 13/305* (2013.01); *F16F 13/105* (2013.01)

(58) Field of Classification Search
CPC ......... F16F 9/535; F16F 9/537; F16F 13/305; F16F 13/105; Y10S 137/909
USPC ................. 137/561 A, 599.01, 807, 827, 909; 188/267, 267.1, 267.2, 313
See application file for complete search history.

(56) References Cited

U.S. PATENT DOCUMENTS

| 6,158,470 | A  | * | 12/2000 | Ivers et al. .................... | 137/807 |
| 6,412,761 | B1 |   | 7/2002  | Baudendistel et al. | |
| 6,622,995 | B2 |   | 9/2003  | Baudendistel et al. | |
| 6,637,556 | B1 | * | 10/2003 | Lun .............................. | 188/267 |
| 2007/0144842 | A1 | * | 6/2007 | Zhou ............................. | 188/267 |
| 2008/0041677 | A1 | * | 2/2008 | Namuduri .................... | 188/267.2 |
| 2009/0295050 | A1 | * | 12/2009 | Lee et al. .................. | 267/140.14 |
| 2011/0316363 | A1 | * | 12/2011 | Kim .............................. | 310/28 |
| 2012/0132306 | A1 | * | 5/2012 | Kim .............................. | 137/803 |
| 2012/0132492 | A1 | * | 5/2012 | Kim ............................. | 188/267.2 |

FOREIGN PATENT DOCUMENTS

JP    2004-232708 A    8/2004
JP       3603029 B2   10/2004

* cited by examiner

*Primary Examiner* — Craig Schneider
*Assistant Examiner* — Jessica Cahill
(74) *Attorney, Agent, or Firm* — Morgan, Lewis & Bockius LLP

(57) ABSTRACT

An orifice plate apparatus for an engine mount filled with magnetorheological (MR) fluid may include a coil assembly having a coil wound thereon and being annular in shape, a core assembly unit housing the coil assembly, formed in a discoid shape, and defining a flow path of which an upper passage may be disposed in a top surface of the core assembly unit, and a lower passage may be disposed in a bottom surface of the core assembly unit, wherein the flow path may be formed annularly along a perimeter of the coil assembly, and a flow path separator installed between the upper passage and the lower passage, such that only a unidirectional circulation may be enabled for the MR fluid passing through the flow path.

12 Claims, 8 Drawing Sheets

ORIFICE PLATE FOR ENGINE MOUNT FILLED WITH MAGNETORHEOLOGICAL FLUID

CROSS-REFERENCE TO RELATED APPLICATIONS

The present application claims priority to Korean Patent Application No. 10-2011-0076418, filed on Aug. 1, 2011, the entire contents of which is incorporated herein for all purposes by this reference.

BACKGROUND OF THE INVENTION

1. Field of the Invention

The present invention relates to an orifice plate mounted inside a hydraulic engine mount using magnetorheological (MR) fluid, and more particularly, to an orifice plate formed so that a magnetic field is aligned perpendicularly to the flow direction of MR fluid across all regions of the flow path through which the MR fluid flows, and so that the flow path allows only a unidirectional flow along the perimeter of a coil assembly at the inside and outside, respectively, of the coil assembly.

2. Description of the Related Art

In order to dampen engine vibrations, the engine of a vehicle is mounted in the engine room of the vehicle body through engine mounts. Engine mounts that are commonly used are rubber mounts employing the resilience of rubber material, and hydraulic mounts that are filled with liquid and use viscous resistance from the movement of the liquid to dampen vibrations.

Of these, the hydraulic engine mount is configured to dampen vibrations in both a high frequency range and a low frequency range, and are widely used in many types of vehicles.

FIG. 1 illustrates a cross-section of a hydraulic engine mount having a conventional structure. The hydraulic engine mount holds hydraulic fluid in an inner space defined by an insulator 2 and a diaphragm 7, and the inner space has an orifice plate 4 installed therein and is partitioned into an upper liquid chamber 3 and a lower liquid chamber 6.

The orifice plate 4 has a flow path 5 along an inner perimeter thereof for hydraulic fluid to flow through, and has a decoupler selectively mounted in the center thereof. A stud bolt 1 coupled to the insulator 2 is coupled to an engine bracket. Thus, the insulator 2, formed of a resilient material, is repeatedly compressed and restored resiliently by changes in load and vibrations exerted on the stud bolt 1, and the hydraulic fluid flows through the flow path 5 in the upper liquid chamber 3 and the lower liquid chamber 6. This flow of the hydraulic fluid vibrates the decoupler, and vibrations in a high frequency range are dampened through vibrations of the decoupler, and vibrations in a low frequency range are dampened through the flow of hydraulic fluid through the flow path 5.

The hydraulic mount may be filled with MR fluid instead of a general hydraulic fluid. Magnetorheological (MR) fluid is a suspension having smooth, magnetic particles mixed in synthetic hydrocarbon liquid, and has the property of shear stress that varies according to whether a magnetic field is applied nearby and the intensity of an applied magnetic field.

Accordingly, an orifice plate 4' of a hydraulic mount filled with MR fluid, as illustrated in FIG. 2, has a flow path 5' formed vertically therein, and a coil 8 further installed to apply a magnetic field near the flow path 5' through which MR fluid passes. By controlling the amount of current applied to the coil 8, the dynamic stiffness and the damping characteristics of a mount are rendered controllable according to the conditions in which a vehicle travels.

When a magnetic field is not applied, the MR fluid exhibits flow properties similar to a general hydraulic fluid, but when a magnetic field is applied nearby, the particles are aligned in columns to change the flow characteristics of the fluid.

Specifically, the shear stress of the MR fluid is determined as a value that is a multiple of viscosity and shear rate when a magnetic field is not applied, and when a magnetic field is applied, the shear stress of the MR fluid becomes the value (of the multiple of the viscosity and the shear rate) to which a yield shear stress is added. The yield shear stress increases proportionally to the intensity of the applied magnetic field.

As illustrated in FIG. 2, in order to align the particles inside the MR fluid perpendicular to the flow direction, the direction in which the magnetic field is applied should be perpendicular to the flow direction of the MR fluid.

In related art methods, however, while a magnetic field is aligned perpendicular to the flow direction of MR fluid in region "A" and region "C" in a structure in which a coil is disposed a certain distance apart from a side of a flow path, the magnetic field in region "B" is formed in a parallel direction (to the flow direction of the MR fluid) and does not pass through the MR fluid, which thus lowers controlling efficiency.

While the lowered controlling efficiency can be restored by raising the value of the current applied to the coil or forming a longer flow path, this involves the limitation of an increase in size, which increases the amount of heat generated.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE INVENTION

Various aspects of the present invention are directed to providing an orifice plate structure that can obviate the above limitations and more efficiently control the flow characteristics of MR fluid.

In an aspect of the present invention, an orifice plate apparatus for an engine mount filled with magnetorheological (MR) fluid, may include a coil assembly having a coil wound thereon and being annular in shape, a core assembly unit housing the coil assembly, formed in a discoid shape, and defining a flow path of which an upper passage is disposed in a top surface of the core assembly unit, and a lower passage is disposed in a bottom surface of the core assembly unit, wherein the flow path is formed annularly along a perimeter of the coil assembly, and a flow path separator installed between the upper passage and the lower passage, such that only a unidirectional circulation is enabled for the MR fluid passing through the flow path.

In another aspect of the present invention, an orifice plate apparatus for an engine mount filled with magnetorheological (MR) fluid, may include a coil assembly having a coil wound thereon and being annular in shape, and a core assembly unit housing the coil assembly, formed in a discoid shape, and defining at least two flow paths, wherein at least two upper passages are formed in a top surface of the core assembly unit, and at least two lower passages are disposed in a bottom surface of the core assembly unit, wherein the at least two flow paths are formed annularly along a perimeter of the coil assembly, and wherein either of a top and a bottom of the at least two flow paths are aligned in a longitudinal direction of the coil assembly unit.

The at least two flow paths are formed in two locations within the core assembly unit and fluidly-separated each other, may include an inner flow path formed at an inner portion of the coil assembly unit, and an outer flow path formed at an outer portion of the coil assembly unit, wherein first and second flow path separators are respectively installed adjacent to the inner flow path and the outer flow path to change a flow direction of the MR fluid.

The core assembly unit may include a lower plate of a circular plate shape including a protruding portion formed in a center thereof, and first and second lower passages corresponding to the inner flow path and the outer flow path, a lower core of a circular plate shape installed above the lower plate, and including a first passage hole formed therein and communicating with the second lower passage of the outer flow path, and a first hole formed in a center thereof, wherein an inner rim is formed protruding upward along an inner perimeter of the first hole and an outer rim is formed protruding upward along an outer perimeter of the lower core, and an upper core of a circular plate shape installed above the lower core, and including a second passage hole formed therein and a second hole formed in a center thereof, wherein an inner rim is formed protruding downward along an inner perimeter of the second hole and an outer rim is formed protruding downward along an outer perimeter of the upper core such that the protruding portion is coupled to the inner rim of the second hole, wherein the second passage hole fluid-communicates with the first lower passage through a first space formed between the inner rim of the lower core and the inner rim of the upper core, wherein the first passage hole fluid-communicates with a second space formed between the outer rim of the upper case and the outer rim of the lower case, and wherein the core assembly is disposed between the lower core and the upper core, and an upper plate of a circular plate shape installed above the upper core, and including first and second upper passages of the inner flow path and the outer flow path, wherein the second passage hole of the upper case fluid-communicates with the first upper passage and the second space fluid-communicates with the second upper passage.

The first flow path separator is disposed in the first space between the first lower passage and the second passage hole.

The second flow path separator is disposed in the second space between the first passage hole and the second upper passage.

The coil assembly is installed between the inner rim of the lower core and the outer rim of the upper core.

The lower core and the upper core are manufactured of a material having a higher relative permeability than the lower plate and the upper plate.

The inner flow path or the outer flow path may have two or more flow path separators installed therein to prevent fluid-communication therebetween, and an upper passage and a lower passage are additionally formed according to the number of the flow path separators.

The above-configured exemplary embodiments of the present invention have the effects of being capable of more efficiently controlling the flow characteristics of MR fluid by increasing the effective area (an area in which the flow direction of MR fluid and a magnetic field are perpendicular) affected by the magnetic field, by making the flow path circulate only in one direction along the perimeter of the coil assembly. The orifice plate according to exemplary embodiments of the present invention may have flow paths formed at two locations so that MR fluid may flow more quickly, and a greater quantity of MR fluid may be controlled simultaneously.

Further, the flow paths according to exemplary embodiments of the present invention are structures in which a top of an outer flow path and a bottom of an inner flow path protrude perpendicularly from the coil assembly, so that MR fluid flowing at the protruding portions forms a right angle with a magnetic field along the entire perimeter of the flow paths, enabling a further increase in controlling performance (refer to the protruding portions depicted by arrows in FIG. 3).

Accordingly, a lower current may be applied to the coil assembly to prevent an increase in the amount of heat generated, and the coil assembly may be formed smaller.

While a flow path in the related art is formed straight in a vertical direction so that the damping function is greatly reduced when there is a malfunction in the coil assembly, the orifice plate according to exemplary embodiments of the present invention has a flow path formed annularly so that even when a magnetic field is not applied (as in a hydraulic engine mount that uses general hydraulic fluid), when MR fluid flows, a suitable viscous resistance may be induced so as to be capable of providing a minimal amount of damping function.

Further, the lower core and the upper core are manufactured of a material with a high relative permeability, and the lower plate and the upper plate are manufactured of a material with a low relative permeability, so that magnetic lines of force are concentrated at the flow paths to improve controlling efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
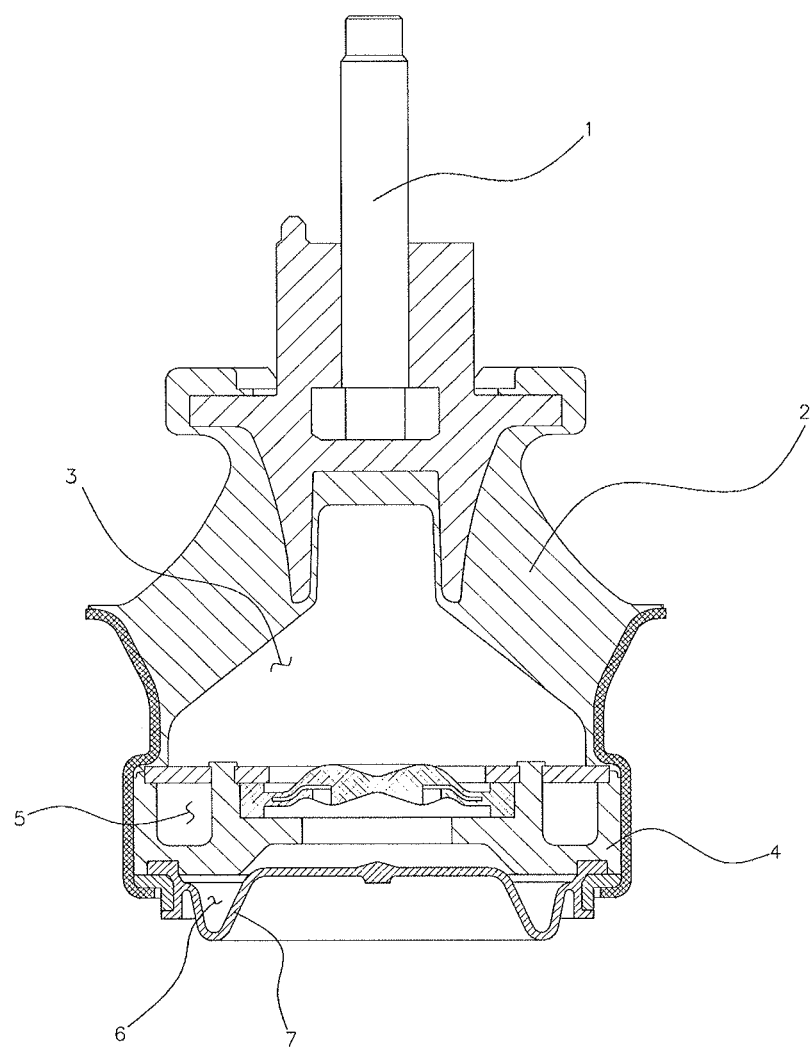
FIG. 1 is a cross-sectional view of an engine mount in which a general hydraulic fluid is filled.
Figure 2:
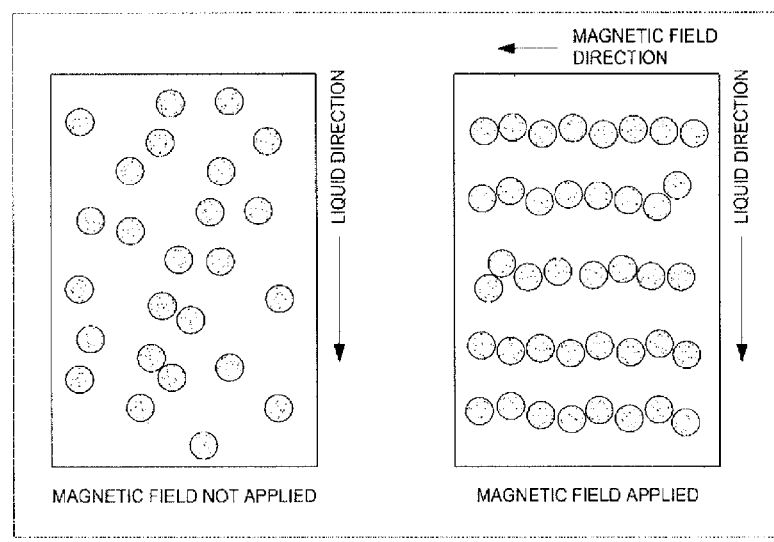
FIG. 2 is a view illustrating a related art orifice plate structure installed in a hydraulic engine mount in which MR fluid is filled, and arranged states of particles in MR fluid according to whether or not a magnetic field is applied.
Figure 2:
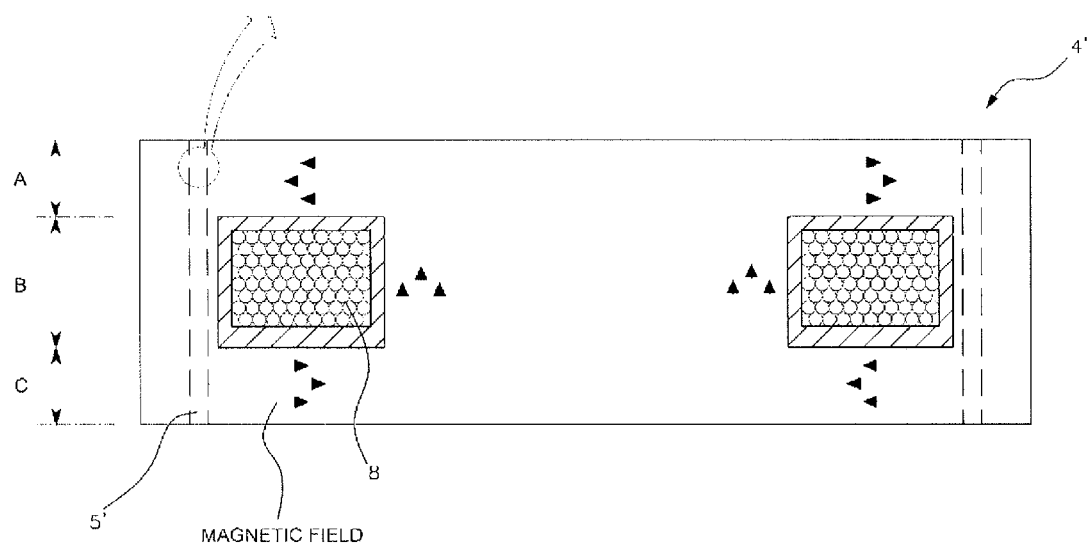

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an orifice plate for an engine mount in which MR fluid is filled, according to exemplary embodiments of the present invention, will be described in detail with reference to the drawings.

Figure 3:
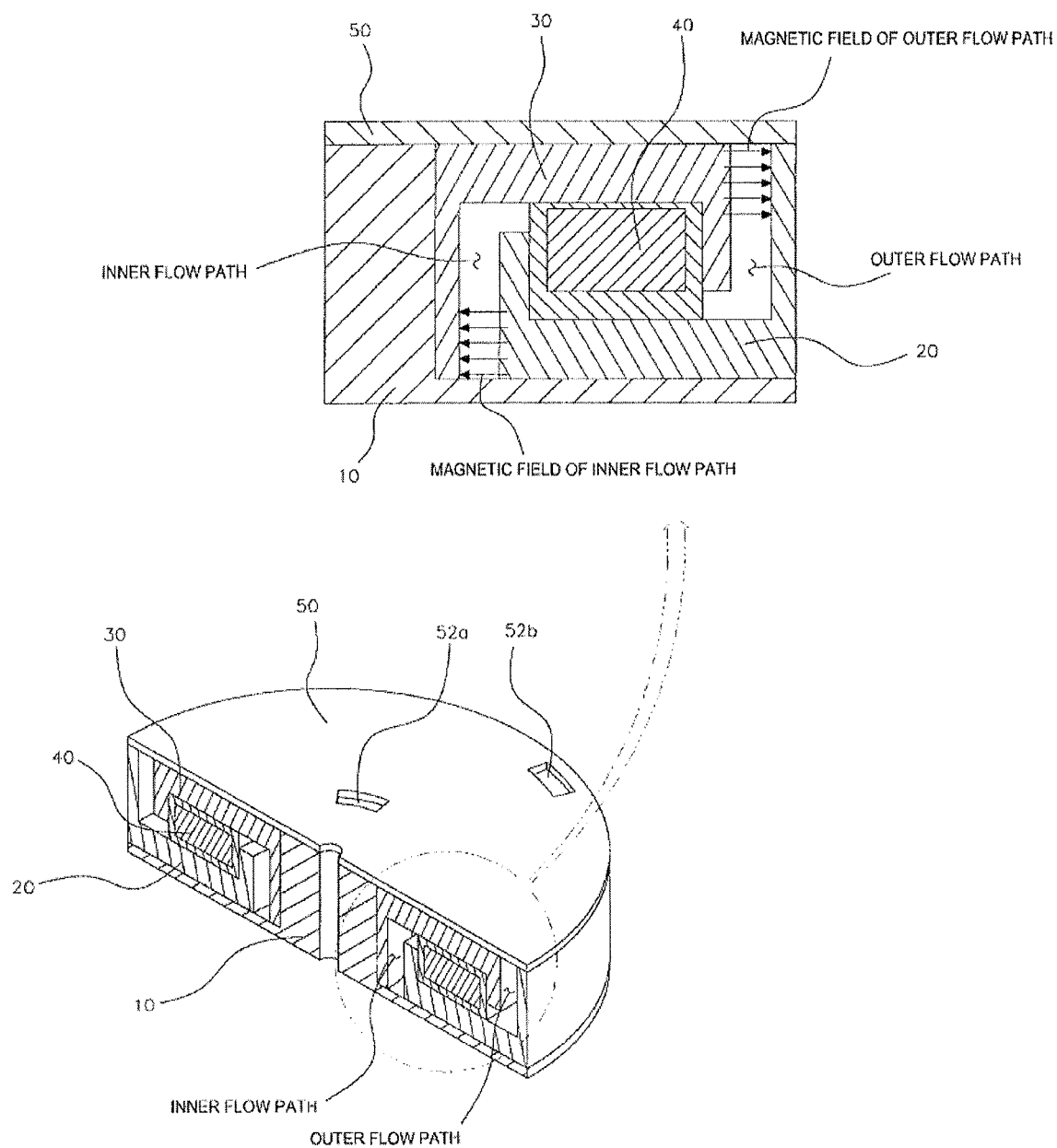
FIG. 3 is a perspective view and a partially enlarged cross-sectional view illustrating the inner shape of an orifice plate according to an exemplary embodiment of the present invention.

An orifice plate according to an exemplary embodiment of the present invention includes, a core assembly housing the coil assembly, formed in a discoid shape, and defining a flow path of which an upper passage is disposed in a top surface of the core assembly, and a lower passage is disposed in a bottom surface of the core assembly. As illustrated in FIG. 3, the core assembly is formed of a lower plate 10, a lower core 20, an upper core 30, and an upper plate 50, which are coupled together, and a coil assembly 40 is installed between the lower core 20 and the upper core 30.

The flow path forms annular inner and outer flow paths along the inner and outer perimeters, respectively, of the coil assembly 40, so as to expand the effective area of the aforementioned magnetic field by means of the overall flow path. In order to allow MR fluid to circulate in only one direction through the flow path, flow path separators 60 and 70 are further installed between the upper passage and the lower passage.

Figure 4:
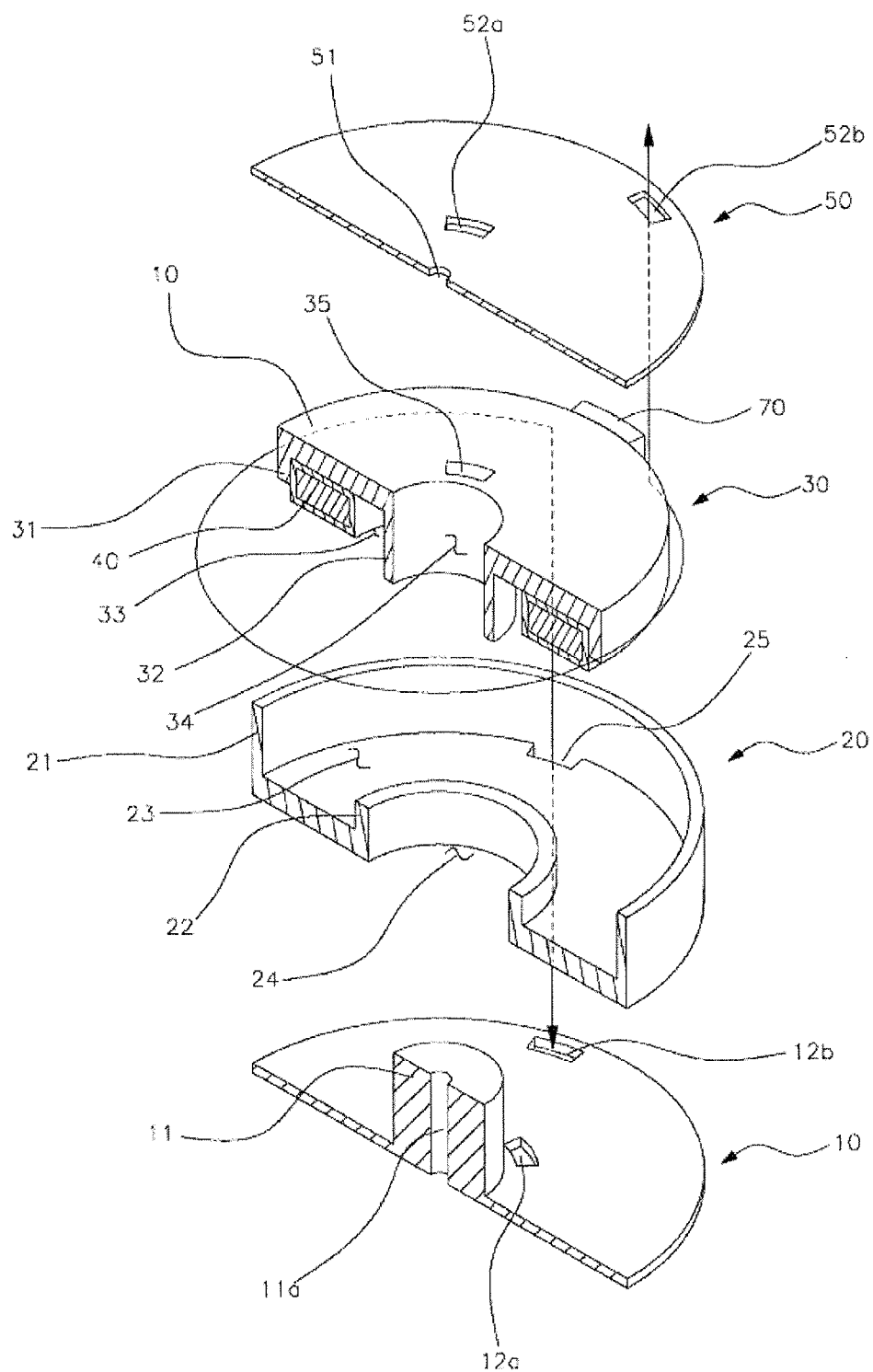
FIG. 4 is an exploded view illustrating the orifice plate in FIG. 3.
Figure 5:
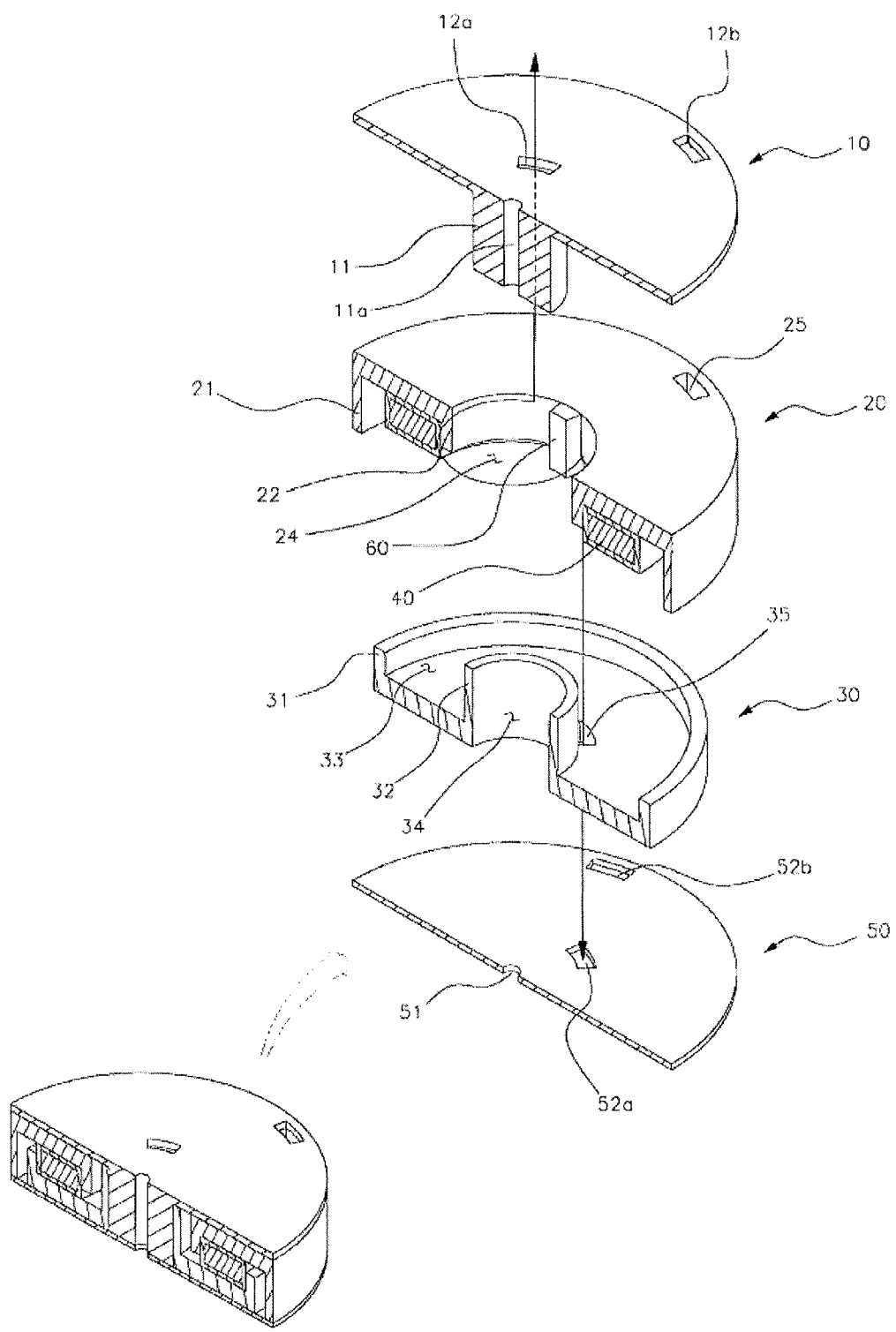
FIG. 5 is a view illustrating the orifice plate in FIG. 3 flipped upside down, and an exploded view of the orifice plate that is flipped.

Referring to FIGS. 4 and 5, the lower plate 10 is formed in a circular plate shape and includes a protruding portion 11 formed in the center thereof, and lower passages 12a and 12b of the inner flow path and outer flow path are formed at respective predetermined positions therein. A bolt hole 11a is defined in the protruding portion 11, in order for a bolt to be fastened and coupled through the protruding portion 11 and a hole 51 of the upper plate 50.

The lower core 20 mounted above the lower plate 10 is formed in a circular plate shape, and defines a passage hole 25 at a position communicating with the lower passage 12b of the outer flow path. A hole 24 having a predetermined inner diameter is formed in the center of the lower core 20, in order for the lower passage 12a of the inner flow path to be exposed at a predetermined distance with the protruding portion 11. In order to form the inner flow path and the outer flow path and form a predetermined space 23 in which the coil assembly 40 is to be seated, an inner rim 22 of a predetermined height (to contact the inner periphery of the coil assembly) protrudes along the perimeter of the hole 24, and an outer rim 21 protrudes upward along a periphery to the outside thereof.

The upper core 30 mounted above the lower core 20 is formed in a circular plate shape, defines a passage hole 35 communicating with an upper passage 52a of the inner flow path, defines a hole 34 at the center thereof into which the protruding portion 11 inserts, and has an inner rim 32 protruding downward along the perimeter of the hole 34. The inner rim 32 has a predetermined outer diameter so as to be disposed to the inside of a lower passage 12 of the inner flow path. An outer rim 31 protrudes downward along an outer perimeter of the upper core 30. Accordingly, a predetermined space 33 defines an inner flow path and an outer flow path between the inner rim 32 and the outer rim 31, and has the coil assembly seated therein.

The upper plate 50 installed above the upper core 30 has a circular plate shape and defines upper passages 52a and 52b of the inner flow path and the outer flow path.

A first flow path separator 60 for partially blocking the inner flow path is mounted at the inside of the central hole 24 of the lower core 20 to contact the protruding portion 11 (refer to FIGS. 5 and 7), and a second flow path separator 70 for partially blocking the outer flow path is mounted at the inside of the outer rim 21 of the lower core 20 to contact the upper core 30.

Figure 6:
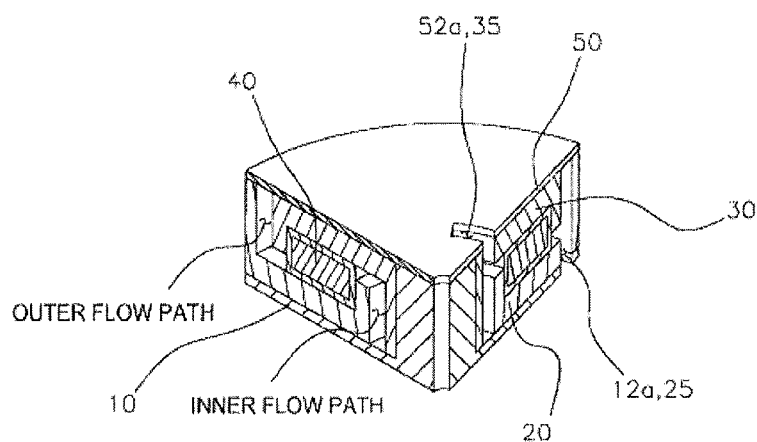
FIG. 6 is views illustrating the orifice plate in FIG. 3 cut into different portions to illustrate the sectional shape of each portion.
Figure 6:
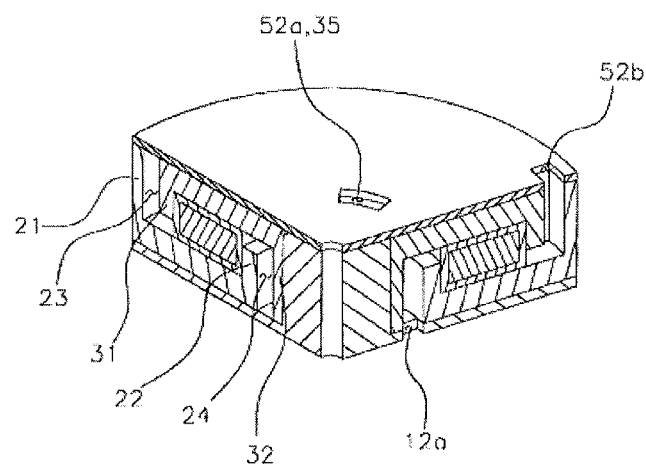
Figure 6:
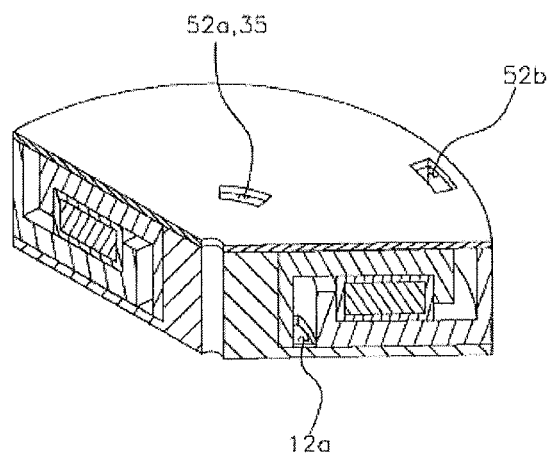

In order to move the MR fluid over the longest distance possible (in order to be affected by a magnetic field as much as possible), as illustrated in FIG. 6, the upper passages 52a and 52b of the inner flow path and the outer flow path, respectively, and the lower passages 12a and 12b are proximately disposed with a predetermined distance therebetween, and the first flow path separator 60 and the second flow path separator 70 are respectively disposed therebetween. Therefore, the MR fluid that flows into the inner flow path or the outer flow path is blocked at the first flow path separator 60 or the second flow path separator 70 and circulates in one direction along the perimeter of the coil assembly.

The coil assembly 40 is configured with a coil cover coupled to an the coil wound in a ring shape, so that MR fluid does not directly contact the coil, and is wired to receive electricity from the outside. In order for the coil assembly 40 to not undulate and be fixed inside the core assembly, the coil assembly 40 is fixed tightly at both sides between the inner rim 22 of the lower core 20 and the outer rim 31 of the upper core 30.

In order for the magnetic lines of force of a magnetic field to be concentrated, the lower core 20 and the upper core 30 may be manufactured of a material with a high relative permeability, and the lower plate 10 and the upper plate 50, and the first flow path separator 60 and the second flow path separator 70 may be manufactured of a material with a low relative permeability.

Figure 7:
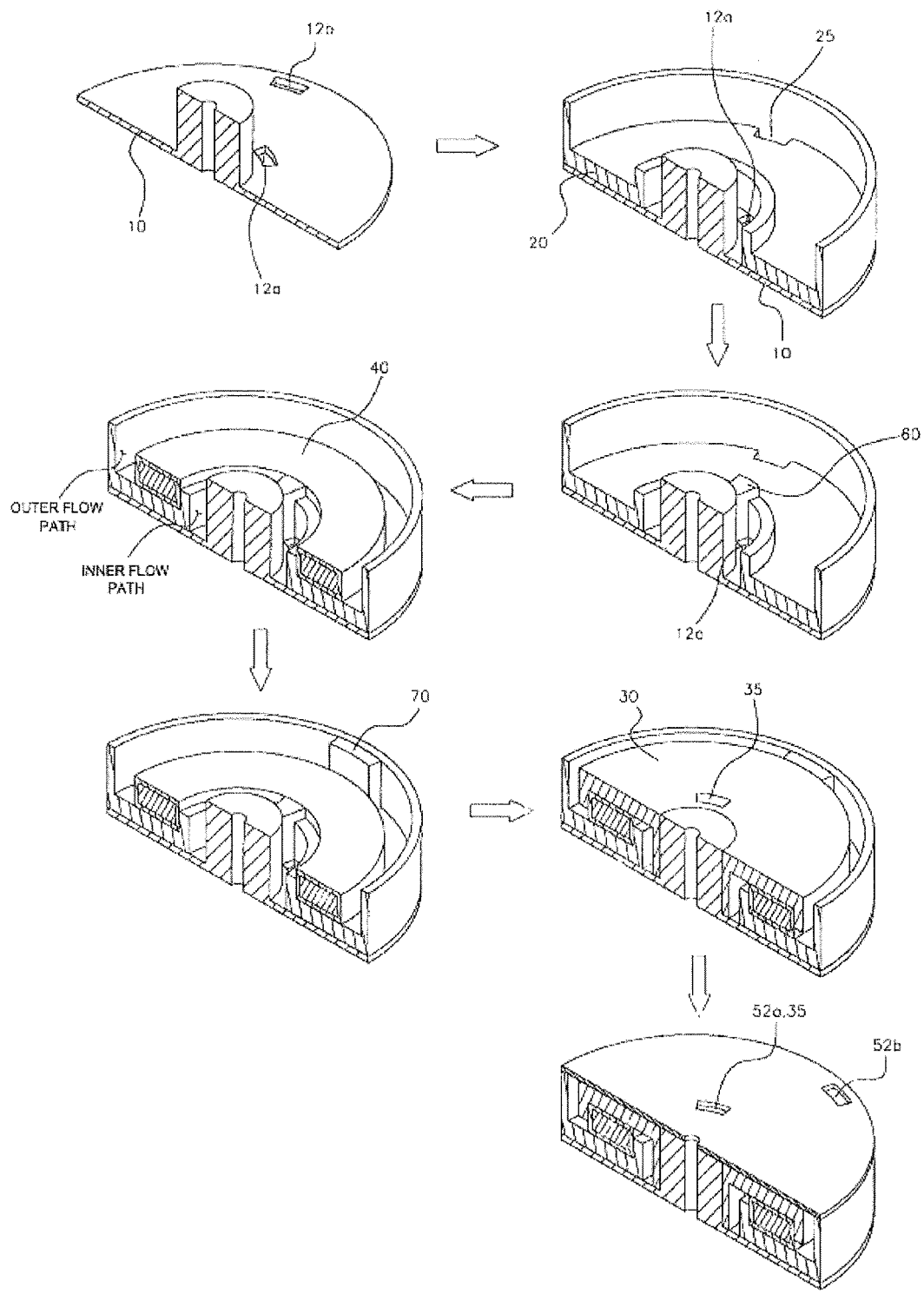
FIG. 7 is a view illustrating the order of assembly of an orifice plate according to an exemplary embodiment of the present invention.

Referring to FIG. 7, in order to expose the lower passage 12a of the inner flow path above the lower plate 10, after the lower core 20 is installed, the first flow path separator 60 is installed at a side of the lower passage 20. The first flow path separator 60 is installed to be disposed between the upper passage 52a and the lower passage 12a of the inner flow path. The coil assembly 40 is seated on the second flow path separator, and the second flow path separator 70 is installed at a side of the lower passage 12b of the outer flow path. The second flow path separator 70 is installed to be disposed between the upper passage 52b and lower passage 12b of the outer flow path. The upper core 30 and the upper plate 50 are sequentially installed to form an inner flow path to the inside of the coil assembly 40 and an outer flow path to the outside of the coil assembly 40.

Figure 8:
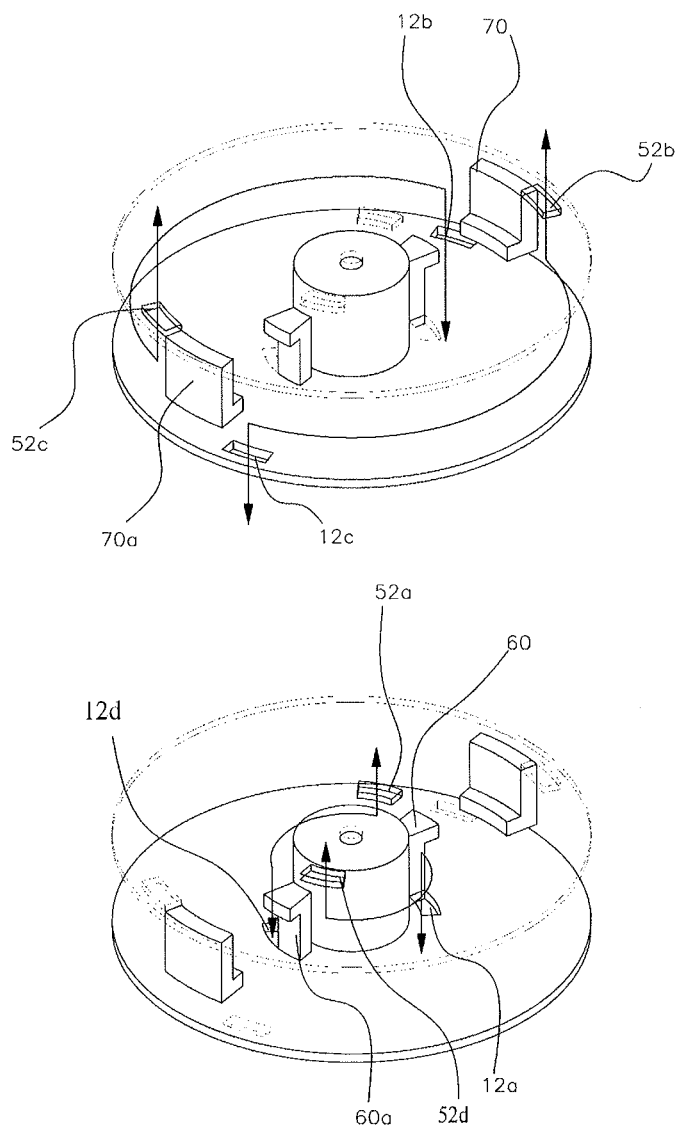
FIG. 8 is a phantom view illustrating the inside of an orifice plate according to another exemplary embodiment of the present invention.

Selectively, as an exemplary embodiment of the present invention, as illustrated in FIG. 8, two or more flow path separators may be installed in the inner flow path or the outer flow path. In this case, an upper passage and a lower passage may be additionally formed, depending on the number of the flow path separators. That is, in order for the MR fluid to circulate for only half a turn along the perimeter of the coil assembly, a first flow path separator 60a and a second flow path separator 70a are additionally installed on the opposite side, and in order for the MR fluid, which has been blocked from flowing by means of the additionally installed flow passage separators 60a and 70a, to be discharged outward, lower passages 12c and 12d and upper passages 52c and 52d may be additionally installed in the lower plate 10 and the upper plate 50. Partitions of such flow paths may be formed according to the properties of MR fluid (such as viscosity, particle density, etc.) That is, if the viscosity of MR fluid is excessively high versus that of a hydraulic fluid in the related art, such that flow rate is low (lower than a set standard) even when a current is not applied to the coil assembly 40, the flow paths may be partitioned to prevent a reduction in the properties. In this case, while the effective area that is affected by a magnetic field may be reduced, controlling efficiency may be compensated for by adjusting the diameter of the upper passage or lower passage or through other forms of tuning.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An orifice plate apparatus in an engine mount filled with magnetorheological (MR) fluid, the orifice plate apparatus comprising,
   a coil assembly having a coil wound thereon and being annular in shape;
   a core assembly unit housing the coil assembly, formed in a discoid shape, and defining a flow path of which an upper passage is disposed in a top surface of the core assembly unit, and a lower passage is disposed in a bottom surface of the core assembly unit, wherein the flow path is formed along an annular perimeter of the coil assembly in a circumferential direction of the core assembly unit in the core assembly unit; and
   a flow path separator installed between the upper passage and the lower passage in the core assembly unit and continuously converting the flow path into an annular flow path along the annular perimeter of the coil assembly by diverting flow of the fluid into the annular flow path while the fluid contacts the flow path separator to prevent the fluid from flowing in a reverse direction such that a unidirectional annular circulation is enabled for the MR fluid in the core assembly unit,
   wherein the flow path includes at least two flow paths formed in two locations within the core assembly unit and fluidly-separated from each other, the at least two flow paths include:
      an inner flow path formed at an inner portion of the coil assembly unit; and
      an outer flow path formed at an outer portion of the coil assembly unit,
   wherein first and second flow path separators are respectively installed adjacent to the inner flow path and the outer flow path to change a flow direction of the MR fluid, and
   wherein the coil assembly generates a magnetic field working for both the inner flow path and the outer flow path,
   wherein the core assembly unit includes:
      a lower plate of a circular plate shape including a protruding portion formed in a center thereof, and first and second lower passages corresponding to the inner flow path and the outer flow path;
      a lower core of a circular plate shape installed above the lower plate, and including a first passage hole formed therein and communicating with the second lower passage of the outer flow path, and a first hole formed in a center thereof, wherein an inner rim is formed protruding upward along an inner perimeter of the first hole and an outer rim is formed protruding upward along an outer perimeter of the lower core; and
      an upper core of a circular plate shape installed above the lower core, and including a second passage hole formed therein and a second hole formed in a center thereof, wherein an inner rim is formed protruding downward along an inner perimeter of the second hole and an outer rim is formed protruding downward along an outer perimeter of the upper core such that the protruding portion is coupled to the inner rim of the second hole,
         wherein the second passage hole fluid-communicates with the first lower passage through a first space formed between the inner rim of the lower core and the inner rim of the upper core,
         wherein the first passage hole fluid-communicates with a second space formed between the outer rim of the upper case and the outer rim of the lower case, and
         wherein the core assembly is disposed between the lower core and the upper core; and
      an upper plate of a circular plate shape installed above the upper core, and including first and second upper passages of the inner flow path and the outer flow path, wherein the second passage hole of the upper case fluid-communicates with the first upper passage and the second space fluid-communicates with the second upper passage.

2. The orifice plate apparatus of claim 1, wherein the first flow path separator is disposed in the first space between the first lower passage and the second passage hole.

3. The orifice plate apparatus of claim 1, wherein the second flow path separator is disposed in the second space between the first passage hole and the second upper passage.

4. The orifice plate apparatus of claim 1, wherein the coil assembly is installed between the inner rim of the lower core and the outer rim of the upper core.

5. The orifice plate apparatus of claim 1, wherein the lower core and the upper core are manufactured of a material having a higher relative permeability than the lower plate and the upper plate.

6. The orifice plate apparatus of claim 1, wherein the inner flow path or the outer flow path has two or more flow path separators installed therein to prevent fluid-communication therebetween, and an upper passage and a lower passage are additionally formed according to the number of the flow path separators.

7. An orifice plate apparatus in an engine mount filled with magnetorheological (MR) fluid, the orifice plate apparatus comprising,
   a coil assembly having a coil wound thereon and being annular in shape; and
   a core assembly unit housing the coil assembly, formed in a discoid shape, and defining at least two annular flow paths, wherein at least two upper passages are formed in a top surface of the core assembly unit, and at least two lower passages are disposed in a bottom surface of the core assembly unit, and wherein the at least two upper passages and the at least two lower passages are fluidly connected to each other through the at least two annular flow paths,
   wherein the at least two annular flow paths are formed along an annular perimeter of the coil assembly in a circumferential direction of the core assembly unit in the core assembly unit,
   wherein the at least two flow paths are formed in two locations within the core assembly unit and fluidly-separated from each other, the at least two flow paths include:
      an inner flow path formed at an inner portion of the coil assembly unit; and
      an outer flow path formed at an outer portion of the coil assembly unit,
      wherein first and second flow path separators are respectively installed adjacent to the inner flow path and the outer flow path to change a flow direction of the MR fluid,
      wherein the coil assembly generates a magnetic field working for both the inner flow path and the outer flow path,
   wherein the core assembly unit includes:
      a lower plate of a circular plate shape including a protruding portion formed in a center thereof, and first and second lower passages corresponding to the inner flow path and the outer flow path;
      a lower core of a circular plate shape installed above the lower plate, and including a first passage hole formed therein and communicating with the second lower passage of the outer flow path, and a first hole formed in a center thereof, wherein an inner rim is formed protruding upward along an inner perimeter of the first hole and an outer rim is formed protruding upward along an outer perimeter of the lower core; and
      an upper core of a circular plate shape installed above the lower core, and including a second passage hole formed therein and a second hole formed in a center thereof, wherein an inner rim is formed protruding downward along an inner perimeter of the second hole and an outer rim is formed protruding downward along an outer perimeter of the upper core such that the protruding portion is coupled to the inner rim of the second hole,
         wherein the second passage hole fluid-communicates with the first lower passage through a first space formed between the inner rim of the lower core and the inner rim of the upper core,
         wherein the first passage hole fluid-communicates with a second space formed between the outer rim of the upper case and the outer rim of the lower case, and
         wherein the core assembly is disposed between the lower core and the upper core; and
      an upper plate of a circular plate shape installed above the upper core, and including first and second upper passages of the inner flow path and the outer flow path, wherein the second passage hole of the upper case fluid-communicates with the first upper passage and the second space fluid-communicates with the second upper passage.

8. The orifice plate apparatus of claim 7, wherein the first flow path separator is disposed in the first space between the first lower passage and the second passage hole.

9. The orifice plate apparatus of claim 7, wherein the second flow path separator is disposed in the second space between the first passage hole and the second upper passage.

10. The orifice plate apparatus of claim 7, wherein the coil assembly is installed between the inner rim of the lower core and the outer rim of the upper core.

11. The orifice plate apparatus of claim 7, wherein the lower core and the upper core are manufactured of a material having a higher relative permeability than the lower plate and the upper plate.

12. The orifice plate apparatus of claim 7, wherein the inner flow path or the outer flow path has two or more flow path separators installed therein to prevent fluid-communication therebetween, and an upper passage and a lower passage are additionally formed according to the number of the flow path separators.

\* \* \* \* \*